Jan. 9, 1962   H. W. NORTON   3,016,152
COUPLING DEVICES FOR RAILWAY VEHICLES
Filed July 14, 1959   4 Sheets-Sheet 1
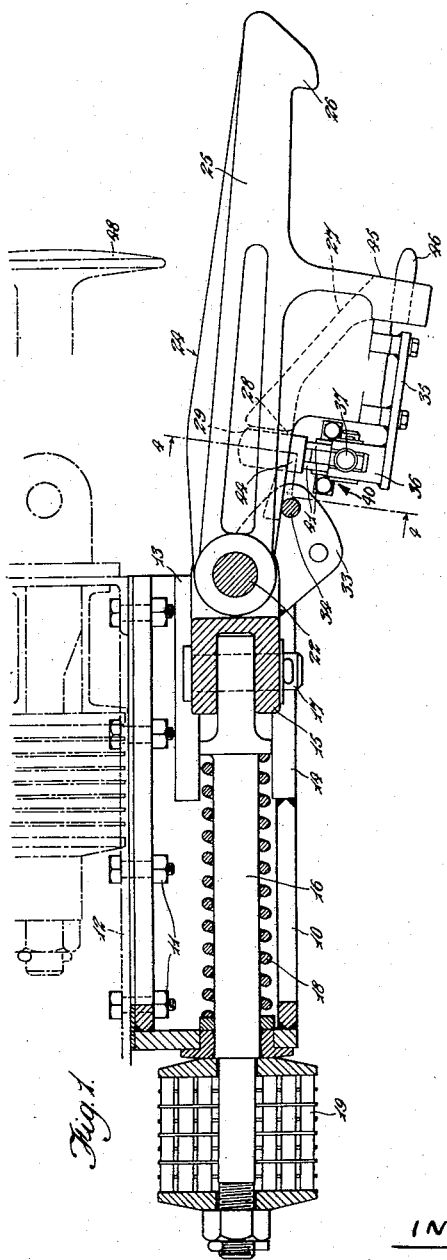
INVENTOR
HARRY WILLIAM NORTON
BY Dean, Fairbank & Hirsch
ATTORNEYS

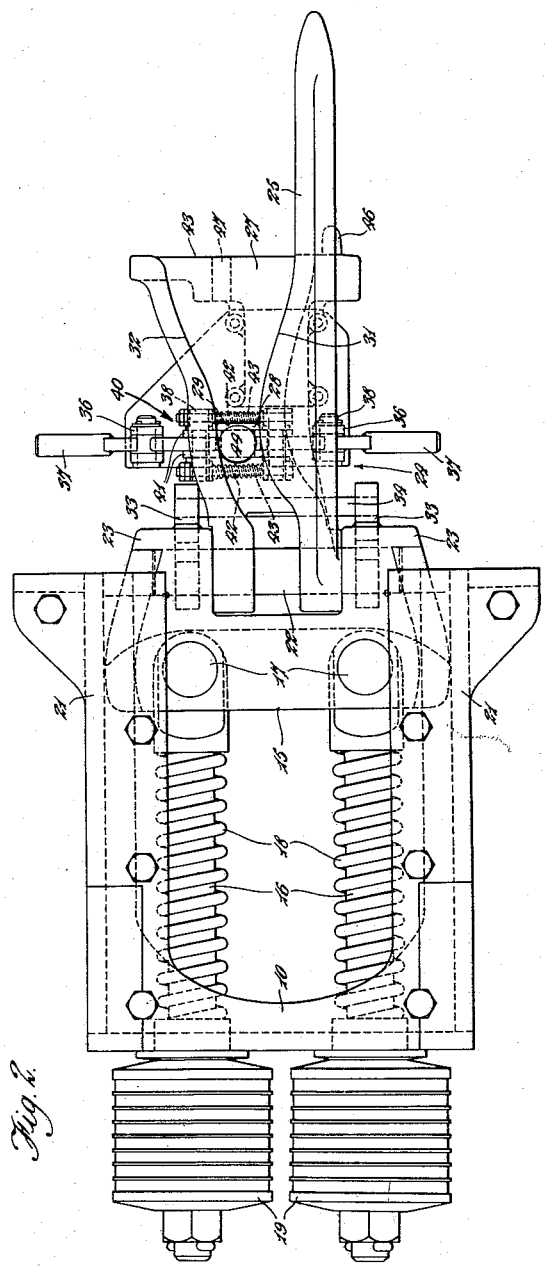

Jan. 9, 1962  H. W. NORTON  3,016,152
COUPLING DEVICES FOR RAILWAY VEHICLES
Filed July 14, 1959  4 Sheets-Sheet 3
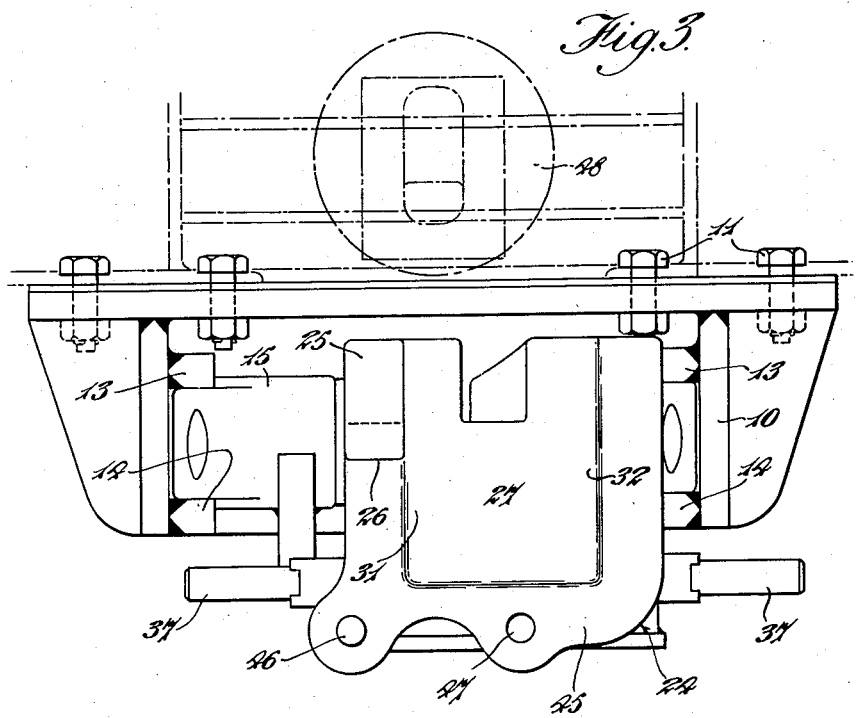
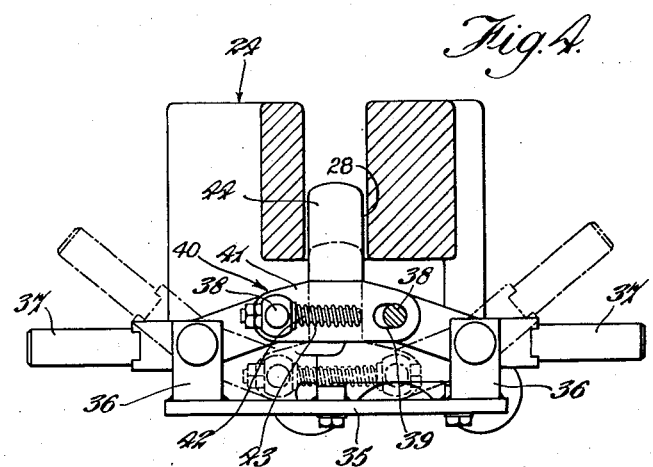
INVENTOR
HARRY WILLIAM NORTON.
By Dean Fairbank & Hirsch
ATTORNEYS

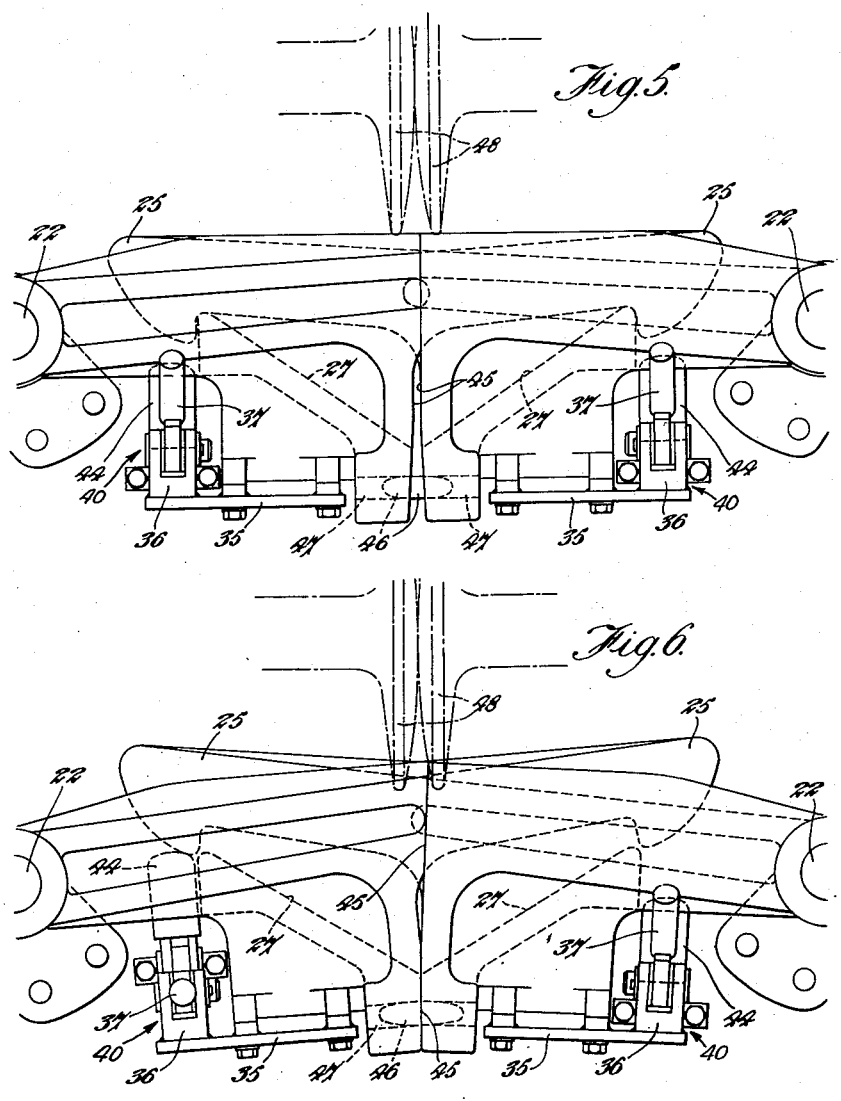

United States Patent Office 3,016,152
Patented Jan. 9, 1962

3,016,152
COUPLING DEVICES FOR RAILWAY VEHICLES
Harry William Norton, Sutton Coldfield, England, assignor to Flight Refuelling Limited, Tarrant, Rushton Airfield, near Blandford, England
Filed July 14, 1959, Ser. No. 827,019
6 Claims. (Cl. 213—89)

This invention relates to coupling devices for railway vehicles, and has for its main object to provide a coupling device which engages automatically on the coming together of two vehicles, and can be readily uncoupled by an operator.

A further object of the invention is to provide a coupling device in which there is a readily visible indication as to whether or not the coupling devices between adjacent vehicles are engaged.

According to the invention, in a coupling device for railway vehicles comprising a coupling unit mounted for turning movement in a horizontal plane and including a hook mounted for turning movement in a vertical plane and a ramp disposed at one side of the hook to lead a corresponding hook of another coupling unit into engagement with a hook-engaging part on said first coupling unit, the ramp is movable as one with the hook of the same coupling unit, and a trip device is provided for lifting the said corresponding hook clear of the hook-engaging part.

The coupling unit is preferably mounted for movement about a horizontal axis on a block resiliently mounted on the vehicle so that impact shocks on coupling, and traction loads, are transmitted resiliently to the vehicle, the block being also capable of rocking in a horizontal plane and being resiliently biased to a position in which the coupling unit lies parallel to the longitudinal axis of the vehicle.

The ramp may be bounded at its sides by upstanding walls converging towards the abutment face so as to lead the co-operating hook laterally into engagement with the abutment face.

The trip device may be arranged for manual operation, and is conveniently operated by a lever extending laterally towards the side of the vehicle, two levers, extending towards opposite sides of the vehicle, preferably being provided.

The invention is hereinafter described with reference to the accompanying drawings, in which:

FIGURE 1 is a side elevation of a coupling device according to the invention, mounted on a railway wagon;

FIGURE 2 is a plan view of the coupling device shown in FIGURE 1;

FIGURE 3 is an end view of the coupling;

FIGURE 4 is a section on the line 4—4 of FIGURE 1, showing the trip device and its operating levers in full lines in one position and in chain dotted lines in another position;

FIGURE 5 is a side elevation on a smaller scale, showing two coupling devices in engagement one with the other; and FIGURE 6 is a view similar to FIGURE 5 but showing the coupling hooks tripped to enable the vehicles on which they are mounted to separate.

Referring to FIGURES 1 to 4 of the drawings, the coupling device comprises a U-shaped frame 10 rigidly secured, as by bolts 11, to the underside of the frame 12 of a railway vehicle, the frame 10 being secured to the frame 12 at the centre of one end of the latter. The frame 10 is provided at its open end with pairs of vertically spaced guide members 13 and 14 between which is slidable a block 15. Two laterally spaced rods 16, 16 pivotally coupled to the block at 17, 17 extend through apertures in the closed end of the frame, and coiled compression springs 18, 18 surrounding the rods 16, 16 urge the block 15 outwardly towards the end of the vehicle, whilst resilient buffers 19, 19 of rubber or like material surrounding the inner ends of the rods 16, 16 transmit tension forces in the said rods to the vehicle frame. The block 15 has rounded sides as shown at 21, so that it is free to turn in a horizontal plane being urged to a central position by the springs 18, 18. The block 15 is forked, and a pivot pin 22 extending horizontally between the arms 23, 23 of the fork carries a coupling unit 24 consisting of a hook arm 25, having a downwardly extending hook projection 26 at its free end, a ramp 27 alongside the hook arm 25 and integral therewith, and a recess 28 at the inner end of the ramp 27 to receive the hook projection of another coupling unit, the recess 28 having a flat abutment surface 29 to be engaged by the abutment surface of the hook projection and constitute a hook engaging part. The hook arm 25 is laterally offset from the centre line of the coupling unit 24, and forms an upstanding side wall 31 on one side of the ramp 27, the other side of the ramp being also provided with an upstanding side wall 32, and the two walls 31 and 32 converging towards the recess.

A pair of plates 33, 33, welded to the fork arms 23, 23 of the block 15, support between them a horizontal rod 34 which supports the coupling unit 24 in a position in which it is inclined downwardly somewhat from the pivot pin 22, as shown in FIGURE 1.

A plate 35 bolted to the underside of the coupling unit 24 carries a pair of laterally spaced upstanding fork members 36, 36 between the limbs of each of which is pivoted a cranked lever 37. The inner ends of the levers 37 are apertured to receive pins 38, 38 which pass through slots 39 (FIGURE 4) in a pair of yoke plates 41, 41 arranged one on each side of the levers 37, the pins 38, 38 extending beyond the yoke plates 41 and being drilled transversely at their ends to receive bolts 42 extending from one pin to the other. Coiled compression springs 43 are mounted on the bolts and serve to urge the pins 38 apart to an extent limited by the bolts 42. A member 44 welded to the yoke plates 41 extends upwardly into the recess 28 adjacent the abutment face 29. When the levers 37 are in the positions shown in full lines in FIGURE 4, the springs 43 oppose their downward movement and so support the member 44 in the position in which its upper surface is level with the upper edge of the abutment face 29. When the levers are moved to the position in which they are shown in chain-dotted lines, their inner ends slope downwardly, and the springs 43 therefore resist upward movement and hold the member 44 in the position, also shown in chain-dotted lines, in which its upper surface is below the upper edge of the abutment face 29. Thus, when the member is in the position shown in chain-dotted lines a hook on another coupling device can engage the abutment face 29, but no engagement can take place when the member 44 is lifted to the full line position. Moreover, the member and its operating levers constitute a trip device, generally indicated by the reference 40, which will disengage a hook from the abutment face.

The coupling unit has a flat end face 45 from which the hook arm 25 projects and, at laterally spaced positions on this face there are provided a tapered dowel 46 and a recess or socket 47. When two coupling units come together, the dowel 46 on each end face 45 will enter the socket 47 on the other end face.

Vehicles fitted with coupling devices according to the invention may also be provided with the usual buffers, shown at 48 in FIGURES 1, 5 and 6, the buffers being slightly compressed when the coupling devices are engaged.

When two vehicles having coupling devices according to the invention come together, the hook projections 26 of the two coupling units ride up the ramps 27 until they come into position above the recesses 28, the convergent side walls 31, 32 of the ramps serving to guide the hooks into the correct positions if there is some degree of lateral offset between the vehicles being coupled, or the vehicles, being on a curved track, are out of alignment.

Provided that the trip blocks 44 of both devices are in their lowered positions, the hook projections drop by gravity into the recesses 28 and engage the abutment surfaces 29, thus engaging the two coupling devices, and the dowels 46 enter the sockets 47. Two coupling devices are shown so engaged in FIGURE 5. If either or both of the trip blocks 44 are raised, the hook projections are unable to drop into the recesses, and no engagement takes place, since even if only one trip block is raised the dowels 46 will prevent the other hook from dropping.

To disengage the coupling devices, one trip block is raised by moving its operating levers 37 to the position shown on the left hand side of FIG. 6, thus lifting one hook projection 26 clear of the recess 28 in which it is engaged, the engagement of the dowels 46 in the sockets 47 causing the other hook projection 26 to be similarly lifted.

The positions of the levers 37 provide a clear indication as to whether or not the coupling devices are engaged, so that a person walking alongside a train can see readily whether the vehicles are properly coupled.

The resilient connection of the block 15 to the frame 10 may be effected by a single rod similar to the rods 16, 16, similarly provided with a compression spring and resilient buffer, the spring, instead of acting on the rod, acting on a collar slidable on the rod and having a wedge-shaped nose engaging in a wedge-shaped notch in the block, so that the spring tends to centre the block relative to the frame.

If desired, the flat end faces 45 on the coupling units may be recessed to receive spring-loaded joint rings which abut one another when the coupling units come together, the recesses being connected by passages in the coupling units and flexible hoses connected to the said passages, to train-pipes on the vehicles, thus providing for the automatic coupling of the train pipes. Thus vacuum or air pressure brakes on the vehicles can be connected up automatically at the same time as the vehicles are coupled.

It will be apparent that, since the flat end faces 45 have no relative sliding movement during engagement and disengagement of the coupling units, the joint rings will come together without any relative sliding movement, thus avoiding wear of and damage to the joint rings.

I claim:

1. A coupling device for railway vehicles comprising coupling units mounted at the ends of railway vehicles to interengage when said vehicles come together, a mounting block for each of said coupling units, means supporting said mounting blocks for horizontal turning movement relative to said vehicles, horizontal pivot connections between said coupling units and said mounting blocks, each of said coupling units comprising a hook arm having a hook projection at its free end, a ramp integral with said hook arm and disposed to one side of said hook arm, and a hook-engaging part at the inner end of said ramp to receive the hook projection of a mating coupling unit, the hook engaging part of each coupling unit being offset longitudinally from the hook arm of said coupling unit, a trip device on each coupling unit operable to lift the hook arm of a coupling unit mating therewith clear of the hook-engaging part of the coupling unit with which it is mated, and interengaging means on said coupling units intermediate the hook arms and hook-engaging parts thereof whereby the lifting movement of one hook arm is transmitted to the other hook arm to lift both hook arms simultaneously clear of the hook-engaging parts.

2. A coupling device according to claim 1 wherein a flat end face on the coupling unit adapted to abut a corresponding face on a mating coupling unit is provided with a projecting tapered dowel and a recess to enter and receive respectively a corresponding recess and dowel on the mating unit, so that lifting of the hook arm on one coupling unit by the trip device on the other causes corresponding lifting of the hook arm on the said other coupling unit.

3. A coupling device for railway vehicles comprising coupling units mounted at the ends of railway vehicles to interengage when said vehicles come together, a mounting block for each of said coupling units, guide means on said vehicles supporting said mounting blocks for longitudinal rectilinear movement and horizontal turning movement, resilient means acting on said mounting blocks to resist said longitudinal and turning movements, horizontal pivot connections between said coupling units and said mounting blocks, each of said coupling units comprising a hook arm having a hook projection at its free end, a ramp integral with said hook arm and disposed to one side of said hook arm, and a hook-engaging part at the inner end of said ramp to receive the hook projection of a mating coupling unit, the hook-engaging part of each coupling unit being offset lonigtudinally from the hook arm of said coupling unit, a trip device on each coupling unit operable to lift the hook arm of a coupling unit mating therewith clear of the hook-engaging part of the coupling unit with which it is mated, and interengaging means on said coupling units intermediate the hook arms and hook-engaging parts thereof whereby the lifting movement of one hook arm is transmitted to the other hook arm to lift both hook arms simultaneously clear of the hook-engaging parts.

4. A coupling device according to claim 3, wherein a pair of laterally spaced longitudinal rods, slidable in the frame and pivotally coupled to the block, are urged towards the end of the vehicle at which the coupling device is mounted by springs.

5. A coupling device according to claim 3, wherein a traction pull on the said coupling device is transmitted from the rods to the frame through rubber blocks.

6. A coupling device for railway vehicles comprising coupling units mounted at the ends of railway vehicles to interengage when said vehicles come together, a mounting block for each of said coupling units, means supporting said mounting blocks for horizontal turning movement relative to said vehicles, horizontal pivot connections between said coupling units and said mounting blocks, each of said coupling units comprising a hook arm having a hook projection at its free end, a ramp integral with said hook arm and disposed to one side of said hook arm, and a hook-engaging part at the inner end of said ramp to receive the hook projection of a mating coupling unit, the hook-engaging part of each coupling unit being offset longitudinally from the hook arm of said coupling unit, a trip device on each coupling unit comprising a member vertically slidable in said coupling unit so that upward movement thereof lifts the hook arm of a mating coupling unit clear of the hook-engaging part, lever means movable through a dead-centre position to lift and lower said vertically slidable member, and spring means acting on said lever means to urge said lever means away from the dead-centre position in both directions, and interengaging means on said coupling units intermediate the hook arm and hook-engaging parts thereof whereby the lifting movement of one hook arm is transmitted to the other hook arm to lift both hook arms simultaneously clear of the hook-engaging parts.

References Cited in the file of this patent

UNITED STATES PATENTS

| | | |
|---|---|---|
| 668,531 | Lyon | Feb. 19, 1901 |
| 884,801 | Ulieger | Apr. 14, 1908 |
| 1,257,904 | Machoroski | Feb. 26, 1918 |
| 1,450,248 | Carr | Apr. 3, 1923 |
| 1,608,300 | Caruso | Nov. 23, 1926 |
| 2,052,993 | Tomlinson | Sept. 1, 1936 |
| 2,240,137 | Gilbert et al. | Apr. 29, 1941 |